United States Patent [19]

Nowell et al.

[11] 4,381,289
[45] Apr. 26, 1983

[54] PROCESS FOR PREPARING ZIRCONIUM PHOSPHATE

[75] Inventors: Derek V. Nowell, Hatfield; Koteswararao Rentala, Stevenage, both of England

[73] Assignee: National Research Development Corporation, London, England

[21] Appl. No.: 326,927

[22] Filed: Dec. 2, 1981

[30] Foreign Application Priority Data

Dec. 10, 1980 [GB] United Kingdom ............... 8039546

[51] Int. Cl.$^3$ ...................... C01B 15/16; C01B 25/26
[52] U.S. Cl. .................................. 423/311; 423/305
[58] Field of Search ............... 423/305, 307, 308, 309, 423/311, 312, 313

[56] References Cited

U.S. PATENT DOCUMENTS 3,056,647 10/1962 Amphlett ............................ 423/311
4,025,608 5/1977 Tavill et al. ......................... 423/311

FOREIGN PATENT DOCUMENTS 1586625 1/1970 France ................................. 423/305
46-10412 3/1973 Japan .................................. 423/305
385922 6/1973 U.S.S.R. .............................. 423/305

*Primary Examiner*—Helen M. McCarthy
*Assistant Examiner*—Gregory A. Heller
*Attorney, Agent, or Firm*—Oblon, Fisher, Spivak, McClelland & Maier

[57] ABSTRACT

Crystalline alpha zirconium phosphate $Zr(HPO_4)_2 \cdot H_2O$, which can selectively remove ammonia and heavy metal ions from solution by ion exchange, is made by forming a room-temperature solution of zirconyl chloride $ZrOCl_2$ in hydrochloric acid and adding sodium fluoride; the pH is now at most 1.6, the zirconium concentration is about 0.1M and the molar ratio sodium:zirconium is 5:1. Then, with rapid mixing, this composition is added to 15M phosphoric acid $H_3PO_4$ (molar ratio phosphate:zirconium at least 3:1). Zirconium phosphate is precipitated.

10 Claims, No Drawings

PROCESS FOR PREPARING ZIRCONIUM PHOSPHATE

This invention relates to a method of making zirconium phosphate.

Various methods of making zirconium phosphate have been tried. In one, a mixture of fibrous zirconia, orthophosphoric acid and 50% hydrochloric acid was boiled under reflux conditions for 5 days, yielding a precipitate of zirconium phosphate; this method is slow and costly in energy. In a second method, zirconia fibres were dissolved by heating them with a mixture of ammonium sulphate (solid) dissolved in concentrated sulphuric acid; the resulting solution was cooled, diluted and filtered, and to it were added 40% hydrofluoric acid and then 88% orthophosphoric acid. Zirconium phosphate started to precipitate after 2 hours at 70° C. This method requires some heating and the handling of strong hydrofluoric acid, which is a notoriously inconvenient and dangerous material.

A method of making zirconium phosphate at room temperature and without handling hydrofluoric acid would therefore be desirable, since zirconium phosphate has the important practical property of selectively removing ammonium and heavy metal (e.g. cadmium) ions from solution by ion exchange. This property may be exploited in artificial kidney machines (for removing ammonia from blood) and in atomic energy installations (for removing cadmium and like trace elements from waste streams).

According to the present invention, we make zirconium phosphate by forming a solution of zirconyl chloride in hydrochloric acid, the solution having a pH not exceeding 0.3; adding sodium fluoride (to a minimum molar ratio sodium:zirconium of 4:1 and subject to a maximum of 5.0:1 at a zirconium concentration of 0.1 M, of 5.2 at 0.07 M and 9 at 0.05 M); ensuring that the solution is homogeneous, at a maximum pH of 1.6, and at a concentration of from 0.05 to 0.1 M in zirconium; and mixing the solution with phosphoric acid such that in the mixture the molar ratio phosphate:zirconium is always, or substantially always, at least 3, preferably at least 6, more preferably at least 12, most preferably at least 15. Zirconium phosphate normally precipitates quickly. Concentrations of zirconium should be measured after adding the volume of the phosphoric acid, but as the phosphoric acid is preferably used in a molarity of at least 15, the actual volume of the phosphoric acid added is too small to affect the absolute zirconium concentration by much.

Preferably, the solution containing the zirconium, hydrochloric acid and fluoride is introduced into a volume of the phosphoric acid, but the reverse is possible, i.e. to introduce the phosphoric acid into a volume of the solution, given appropriate mixing so that when a zirconium ion 'sees' phosphoric acid approaching, sufficient phosphate ions are in the vicinity to ensure precipitation of zirconium phosphate and not some unwanted gel. These circumstances—adequate local concentrations of phosphate ion—are of course more easily ensured by the above preferred order of addition, which may for example comprise metering fine jets of zirconium etc. solution into a stream of phosphoric acid. Nonetheless, in the Examples, the 'reverse' order of addition proved satisfactory on the scale employed there. The 'reverse' order has the advantage of needing only one mixing vessel, whereas the preferred order needs two.

The preferred sodium:zirconium molar ratio is at least 4.5:1, more preferably at least 5.0:1, but maximum preferably 5.0:1 at 0.1 M zirconium, 5.1 at 0.07 M and 8 at 0.05 M. The solution before the addition of the sodium fluoride preferably has a pH not exceeding 0.2, more preferably not exceeding 0.1. On adding the sodium fluoride, fluoride ion forms a complex with the zirconium. Accordingly, the ratio sodium-ion:fluoride-ion increases and the pH rises. While we say that this pH must be ensured to be a maximum of 1.6, this step of 'ensuring' is satisfied if, following an experimental run wherein the pH, homogeneity and zirconium concentration are checked and found to be correct, production runs use quantities of raw materials corresponding to those used in the experimental run, even if the pH etc. are not necessarily checked in every production run.

Sodium fluoride is cheap and easily available, and may be added as solid or solution as long as the pH, homogeneity and other conditions are met before the mixing with phosphoric acid. If the sodium fluoride is added to the hydrochloric acid before the zirconyl chloride is dissolved in the acid, an awkward gel forms. Moreover, there is a limit to the concentration of the acid, since it must dissolve at least 0.05 moles zirconyl chloride per liter, and if the acid is too concentrated, this will be impossible owing, probably, to a common ion effect.

The invention will now be described by way of example.

EXAMPLE 1

Zirconyl chloride octahydrate ($ZrOCl_2.8H_2O$, 32 g) was dissolved in 900 ml of 1.1 molar hydrochloric acid (HCl), with stirring for approximately half an hour until the pH becomes steady. The value of pH depends on how long the zirconyl chloride solution is left standing, but after 24 hours will reach approximately the pH of hydrochloric acid of the same concentration.

Sodium fluoride (NaF, 21 g) was added to this solution with stirring for half an hour. The pH rose steadily and levelled off at approximately 1.5 to 1.6 when the sodium fluoride had fully dissolved.

The solution now had a sodium concentration of 0.55 molar and a zirconium concentration of 0.11 molar, and hence a sodium:zirconium molar ratio of 5.0:1.

Then 15 M orthophosphoric acid ($H_3PO_4$, specific density 1.7, 100 ml) was added to the solution and stirred thoroughly and quickly. This diluted the sodium and zirconium concentrations to 0.50 and 0.10 molar respectively. The molar ratio phosphate:zirconium was about 8:1. A precipitate formed almost immediately. Stirring was continued for 1 hour to ensure complete precipitation. The precipitate was filtered (Whatman No. 1 filter paper), washed with distilled water and dried under vacuum, no drying agent nor heat being necessary. The product was alpha zirconium phosphate powder $Zr(HPO_4)_2.H_2O$ of good purity and pronounced crystallinity, in a yield of 90% based on the zirconyl chloride.

EXAMPLE 2

As a by-product from another chemical process, 'industrial' quality zirconyl chloride was obtained in the form of an aqueous solution containing 2.4 M zirconium and miscellaneous impurities, particularly hydrochloric acid.

To 1.27 liters of this solution, placed in a 40 liter mixing vessel, 30 liters of water were added, followed by 2.54 liters of 11 M hydrochloric acid, all at room temperature. The acid quantity was calculated after allowing for the hydrochloric acid present in the zirconyl chloride solution. (In another experiment, the order of addition was: zirconyl chloride solution; hydrochloric acid; water, and this gives identical results). The vessel was constantly stirred during these additions, and was stirred for a further half-hour. Because of impurities in the zirconyl chloride solution, the stirring clouded the solution and raised foam, which was left to settle for 15–30 minutes, until the solution was reasonably clear; if left excessively longer than 30 minutes, the solution tended to hydrolyse.

Then 638 g sodium fluoride were added little by little, with constant stirring. The addition was at a sufficiently low rate (taking about 2 minutes altogether) to avoid hydrolysis. Stirring was continued for at least half hour, but not for much longer than 1 hour, as hydrolysis then tended again to occur and the pH would rise too high. The pH of the (still foamy) solution was checked to be about 1.5–1.6, and, the zirconium concentration being 0.09 M, the molar ratio Na:Zr (by calculation) was 4.9–5.0:1.

Then, 3.1 liters of orthophosphoric acid of specific density 1.7 (i.e. about 15 M) were added rapidly with fast stirring using baffles to ensure the most rapid possible dispersal, so as to minimize concentration gradients. A precipitate started to form in a minute or two, and increased with further stirring. The quantity of orthophosphoric acid was calculated to give a molar ratio phosphate:zirconium of 14.8–15.0:1. In Example 1, the corresponding ratio was about 8:1, but in the present case ratios of 8:1 or even 10 or 12:1 were inadequate for best results, less desirable products such as amorphous zirconium phosphate being obtained at the expense of the more desired crystalline zirconium phosphate. On a production scale, therefore, a ratio of at least 15:1 appears likely to be desirable.

By leaving the precipitate to stand overnight in contact with the mother liquor, both yield and product crystallinity were slightly improved. The precipitate was filtered, washed thoroughly and dried in air. (Vacuum drying, if overdone, can lead to slight loss of water of crystallisation). The yield (without the standing overnight in contact with the mother liquor) of usefully crystalline alpha zirconium phosphate $Zr(HPO_4)_2 \cdot H_2O$ was 60% based on the zirconyl chloride. Careful attention to vessel and stirrer design may help to improve this yield.

We claim:

1. A process for preparing zirconium phosphate comprising:
   (1) forming a solution of zirconyl chloride in hydrochloric acid, the solution having a pH not exceeding 0.3;
   (2) adding sodium fluoride to a minimum molar ratio sodium:zirconium of 4:1 and subject to a maximum of 5.0:1 at a zirconium concentration of 0.1 M, of 5.2 at 0.07 M and 9 at 0.05 M;
   (3) ensuring that the solution is homogeneous, at a maximum pH of 1.6, and at a concentration of from 0.05 to 0.1 M in zirconium;
   (4) mixing the solution with phosphoric acid such that in the mixture the molar ratio phosphate:zirconium is substantially always at least 3, whereby zirconium phosphate precipitates; and
   (5) recovering said precipitated zirconium phosphate.

2. A process for preparing zirconium phosphate according to claim 1, wherein the said molar ratio phosphate:zirconium is substantially always at least 6.

3. A process for preparing zirconium phosphate according to claim 2, wherein the said molar ratio phosphate:zirconium is substantially always at least 12.

4. A process for preparing zirconium phosphate according to claim 3, wherein the said molar ratio phosphate:zirconium is substantially always at least 15.

5. A process for preparing zirconium phosphate according to claim 1, wherein the solution containing the zirconium, hydrochloric acid and fluoride is introduced into a volume of the phosphoric acid.

6. A process for preparing zirconium phosphate according to claim 1, wherein the molar ratio sodium:zirconium is at least 4.5:1.

7. A process for preparing zirconium phosphate according to claim 6, wherein the molar ratio sodium:zirconium is at least 5.0:1.

8. A process for preparing zirconium phosphate according to claim 1, wherein the molar ratio sodium:zirconium is at most 5.0:1 at 0.1 M zirconium, 5.1:1 at 0.07 M zirconium or 8:1 at 0.05 M zirconium.

9. A process for preparing zirconium phosphate according to claim 1, wherein the zirconyl chloride/hydrochloric acid solution before the addition of the sodium fluoride has a pH not exceeding 0.2.

10. A process for preparing zirconium phosphate acording to claim 9, wherein the said pH of the zirconyl chloride/hydrochloric acid solution does not exceed 0.1.

* * * * *